United States Patent [19]

Tomatis

[11] 4,182,232
[45] Jan. 8, 1980

[54] CURD MIXER FOR MAKING COTTAGE CHEESE

[76] Inventor: Stefano Tomatis, S. Lorenzo, Italy

[21] Appl. No.: 929,788

[22] Filed: Jul. 31, 1978

[51] Int. Cl.² .................................................. A01J 25/00
[52] U.S. Cl. ........................................ 99/461; 366/156; 366/277; 426/583
[58] Field of Search ................ 99/452, 456, 460, 461, 99/462, 465, 466; 426/582, 583; 366/277, 278, 261, 156, 157, 158

[56] References Cited

U.S. PATENT DOCUMENTS

| | | | |
|---|---|---|---|
| 338,538 | 3/1886 | Marchand | 99/461 |
| 2,496,001 | 1/1950 | Caumartin | 99/456 |
| 3,193,928 | 7/1965 | Collins | 99/461 |
| 3,193,929 | 7/1965 | Collins | 99/461 |
| 3,859,906 | 1/1975 | Bratland | 99/460 |

*Primary Examiner*—Robert W. Jenkins
*Attorney, Agent, or Firm*—Frailey & Ratner

[57] ABSTRACT

A curd mixer for making cottage cheese, comprising a horizontally arranged screw conveyor for feeding curds to a disk cutter for slicing the curds with the addition of hot water, a drop chamber adjacent to and beneath the disk cutter, permitting the sliced curds to drop onto the inlet end of a pair of juxtaposed horizontal screw conveyors mounted for rotation in opposite directions for feeding the sliced curds and water to an oval inlet opening of an elongated mixing basin in which a pair of cooperating plunger arms each supporting a horizontal mixer comb is arranged to exert on the paste of curds and water a mixing action by moving the paste from the longitudinal outer sides of the basin to the center thereof and then upwardly. The mixed paste of curds leaves the mixing basin through an overflow spout for further treatment. Whey formed during mixing is drawn off from the mixing basin by a whey extraction pump. The horizontal arrangement of the conveyor screws avoids excessive compression of the curds and prevents them from becoming too dry.

14 Claims, 4 Drawing Figures

CURD MIXER FOR MAKING COTTAGE CHEESE

This invention relates to a curd mixer for making cottage cheese, in which the curds obtained from milk are mixed with water, usually hot water, and then formed into the desired shapes.

Hitherto the curds were mixed with water in discontinuous mixing machines of a type similar to those used in bread making, in which a pair of plunger arms continuously lifts the curd paste into a rotating cup-like basin. With this type of mixers the basin must be periodically emptied and filled with fresh curds and water to be mixed, so that the production process is discontinuous.

To permit continuous working of the paste and thus a better yield, screw mixers have been proposed in which a pair of inclined conveyor screws of considerable length is supplied with curds and water from the lower end and the curds and water are mixed together along the screw conveyors while gradually moving up to the upper end thereof where the finished paste comes out. Although such a screw mixer does permit the continuous production of paste, the paste produced thereby is not of the same type and quality as that produced by the previously used discontinuously working mixers because the action of the conveyor screws produces an excessively twisting effect on the paste (because of the considerable length of the conveyor screws) and moreover in many types of paste the inclined arrangement of the conveyor screws leads to a separation between the curds and water because the action of the conveyor screws on the more viscous curds is different from that they exert on the more liquid water. Consequently, the produced paste is often too dry, particularly for the production of cheese of the "mozzarella" type.

It is an object of the present invention to eliminate the drawbacks of the prior art and to provide a curd mixer which permits the continuous production of paste for making cottage cheese, such paste having the typical characteristics of the paste produced by the conventional mixers with plunger arms.

Other objects, features and advantages of the invention will appear from the following description and the claims.

These objects are achieved according to the invention by providing a curd mixer for making cottage cheese, comprising an elongated basin defined by an upwardly concave bottom wall and a pair of end walls, with an inlet opening in one of the end walls near the bottom of said basin and an overflow opening in the other end wall adjacent the top thereof, a mixer device with plunger arms provided with elongated mixer combs extending perpendicularly from said plunger arms parallel to said concave bottom wall, and a conveyor screw associated with said inlet opening for feeding curds and water to said basin.

A preferred embodiment of the invention will now be described by way of example and with reference to the accompanying drawings, in which.

Figure 1:
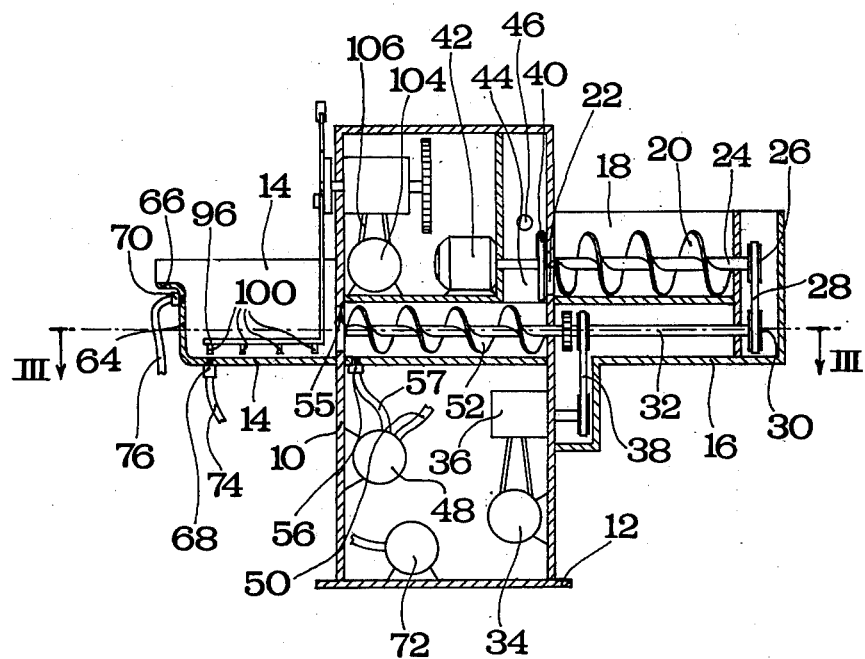
FIG. 1 is a schematic longitudinal section through a curd mixer according to the invention.
Figure 2:
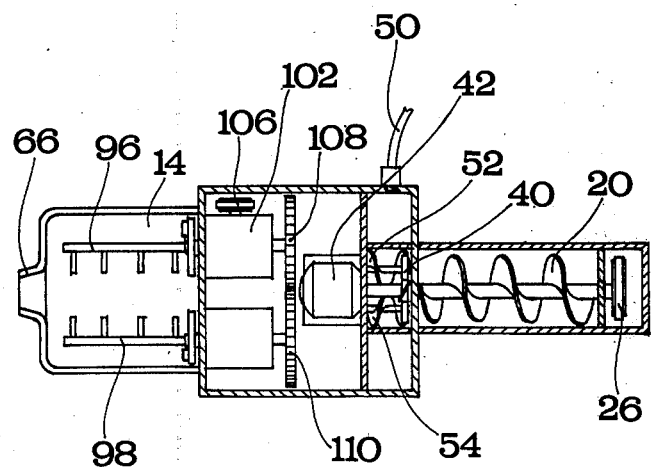
FIG. 2 is a top plan view of the curd mixer of FIG. 1.
Figure 3:
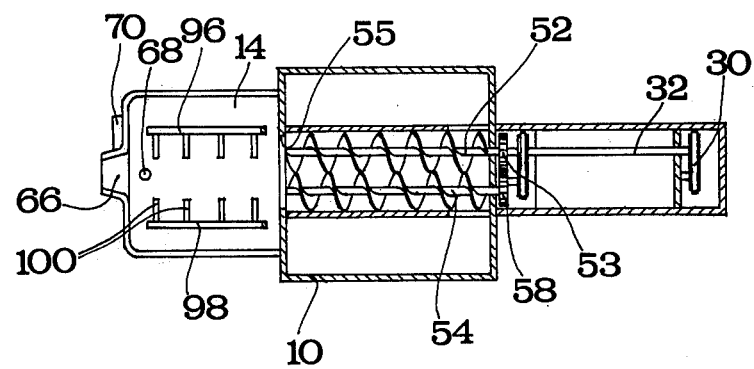
FIG. 3 is a longitudinal section taken along the line III—III of FIG. 1.
Figure 4:
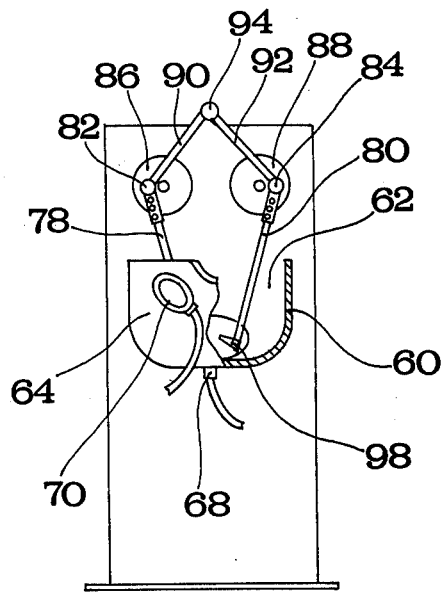
FIG. 4 is an end view of the curd mixer of FIG. 1.

Referring to the drawings, a curd mixer according to the invention comprises a framework 10 extending upwardly from a base 12 and supporting on one side a mixing basin 14 and on the other a frame 16 for receiving a conveyor screw 20 mounted in an open basin 18 supported by the frame 16 for receiving the raw curds which are fed by the conveyor screw 20 to and through an inlet opening 22 in the framework 10. The conveyor screw 20 has a shaft 24 carrying a gearwheel 26 driven through a drive chain 28 by another gearwheel 30 mounted on a shaft 32 in turn driven by a geared motor 34, 36 through a chain drive 38.

The curds pushed through the inlet opening 22 are cut into slices by a disk cutter 40 formed in known manner by a disk having a radial slot accommodating an inclined cutting blade. The disk cutter 40 is driven by an electric motor 42. The sliced curds thus enter a drop chamber 44 provided with a water inlet hole 46 to which water is supplied by a water pump 48 through a conduit 50 shown broken away for clearness of the drawing.

Arranged at the bottom of the drop chamber 44 is a pair of conveyor screws 52, 54. The conveyor screw 52 extends coaxially to and is formed integrally with the drive shaft 32 on which a gearwheel 53 is mounted which meshes with a similar gearwheel 58 mounted on the shaft of the conveyor screw 54. Consequently, the geared motor 34, 36 driving the conveyor screw 20 also drives the conveyor screws 52, 54 in opposite directions so as to feed the curds, which in part have been mixed with water introduced through the water inlet hole 46, toward the mixing basin 14. The curds enter the basin 14 through a substantially oval opening 55. Located adjacent or near the opening 55 is a water inlet hole 56 supplied with water by a hose 57 communicating with the water pump 48.

The basin 14 is formed of a side and bottom wall 60, an end wall 62, preferably formed directly by a wall of the framework 10, and an end wall 64 having at the top an outlet or overflow spout 66. A whey extraction hole 68 is provided in the bottom of the basin adjacent the end wall 64. Another whey extraction hole 70 is provided in the end wall 64 just below the outlet spout 66. The whey extraction holes 68, 70 are connected to a whey extraction pump 72 through hoses 74, 76 shown broken away for clearness of the drawing.

Arranged in the basin 14 is a mixing device comprising a pair of symmetrical plunger arms 78, 80 each pivotally mounted at 82 and 84, respectively, in a cam or crank disk 86, 88 and provided with an extension 90 and 92, respectively, on the opposite side of the pivotal connection, both the extensions 90 and 92 being pivotally mounted in 94. At their lower ends the plunger arms 78 and 80 are provided with mixer combs 96, 98 extending perpendicularly from the lower ends of the plunger arms parallel to the side wall 60 of the basin 14 and each carrying a plurality of mixer teeth 100 extending perpendicularly from the mixer combs in opposite directions from the pair of plunger arms.

Each of the cam or crank disks 86, 88 is driven by a shaft one of which is driven by a reduction gear 102 in turn driven by a motor 104 through a belt drive 106, the other shaft receiving its movement from the first shaft through a transmission comprising a pair of gearwheels 108 and 110.

The mixer further comprises switches and control panels for the various motors and pumps, which are not shown in the drawings nor herein described as they are obvious to one skilled in the art. Further, for the operation of the mixer a source of hot water is required to supply water of a desired temperature.

The operation of the mixer is as follows:

After having switched on the motor 34 for driving the screw conveyors, the motor 42 for driving the disk cutter 40, the motor 104 for driving the mixer device, the water supply pump 48 and the whey extraction pump 72, curds are introduced into the chamber 18. The curds are fed into the inlet opening 22 and finely sliced by the disk cutter 40 and the thin slices of curds fall through the drop chamber 44 onto the inlet end of the pair of conveyor screws 52, 54 while a first dose of water is sprayed onto the sliced curds from the water inlet hole 46. The curds together with the water are fed by the pair of conveyor screws to the mixing basin 14 and enter the latter through the oval opening 55. During this movement the curds and water are preliminarily mixed. A further dose of water is added to the curds from the water inlet hole 56. In the mixing basin 14 the curds and water are then mixed in the conventional manner by the mixer combs 96, 98 which continuously move the paste toward the center and upwardly within the basin.

Thus, the paste is not subjected to any twisting action and is mixed in the conventional manner for a time which depends on the speed of feeding of the pair of conveyor screws 52, 54. The paste thus produced is discharged through the outlet spout 66 and falls into machines or devices for further treatment. The whey which forms during the mixing operation is extracted through the whey extraction hole 70 and the hole 68 located at the bottom of the basin 14 opposite the inlet opening 55.

The preliminary mixing of the curds by the pair of conveyor screws 52, 54 is effected in such a short time that the paste is not subjected to any undesired twisting action. Further, the paste is fed in a horizontal direction and therefore the paste cannot "dry up" as is the case in certain mixers of the prior art. The addition of water in two stages (through the hole 46 and the hole 56) permits the introduction of water into the curds to be adjusted in the best possible manner. The rate of feeding of the curds both by the conveyor screw 20 and the pair of conveyor screws 52, 54 is preferably adjustable by regulating the speed of rotation of the output shaft of the reduction gear 36, for example, by using a pulley of variable diameter on the motor 34.

Although a preferred embodiment of the invention has been described herein in detail and illustrated in the accompanying drawings, it will be understood that the invention is not limited to this precise embodiment and that numerous changes and modifications obvious to one skilled in the art may be made therein without departing from the scope of the invention as defined by the appended claims.

I claim:

1. A curd mixer for making cottage cheese, comprising an elongated basin defined by an upwardly concave bottom wall and a pair of end walls, with an inlet opening in one of the end walls near the bottom of said basin and an overflow opening in the other end wall adjacent the top thereof, a mixer device with plunger arms provided with elongated mixer combs extending perpendicularly from said plunger arms parallel to said concave bottom wall, drive means for driving said plunger arms and a conveyor screw associated with said inlet opening for feeding curds and water to said basin.

2. A curd mixer as claimed in claim 1, wherein a water inlet hole is provided near the inlet opening of said elongated basin.

3. A curd mixer as claimed in claim 2, wherein at the end of said basin opposite to said water inlet hole is provided a whey extraction hole.

4. A curd mixer as claimed in claim 3, wherein a further whey extraction hole is provided in the end wall of said basin having said overflow opening.

5. A curd mixer as claimed in claim 1, wherein said conveyor screw comprises a pair of juxtaposed individual conveyor screws mounted for rotation in opposite directions in a housing of substantially oval shape in cross section.

6. A curd mixer as claimed in claim 5, wherein each of said pair of juxtaposed conveyor screws has an axis provided with an extension supporting a gearwheel, this pair of gearwheels meshing with each other and only one of said juxtaposed conveyor screws being driven by a motor.

7. A curd mixer as claimed in claim 5, wherein said pair of juxtaposed conveyor screws extends from said substantially oval housing into a drop chamber supplied with sliced curds from above, said sliced curds dropping through said drop chamber onto the inlet end of said juxtaposed conveyor screws.

8. A curd mixer as claimed in claim 7, wherein a water inlet opening is provided in one of the walls of said drop chamber.

9. A curd mixer as claimed in claim 7, wherein a curd inlet opening is provided in one of the walls of said drop chamber and a disk cutter having a radial slot accommodating a cutting blade is mounted for cooperation with said curds inlet opening to slice the curds.

10. A curd mixer as claimed in claim 9, wherein a further conveyor screw is provided for feeding the curds to said curds inlet opening of said drop chamber.

11. A curd mixer as claimed in claim 1, wherein a whey extraction hole is provided at the end of said basin opposite to said water inlet hole and another whey extraction hole is provided in the end wall of said basin having said overflow opening and both said whey extraction holes are connected by means of hoses to a whey extraction pump.

12. A curd mixer as claimed in claim 1, wherein a water inlet hole is provided near the inlet opening of said elongated basin and another water inlet opening is provided in a wall of a drop chamber located adjacent to and upwardly of a substantially oval housing accommodating a pair of juxtaposed conveyor screws forming said conveyor screw associated with said inlet opening and both said water inlet holes are connected by means of hoses to a water supply pump.

13. A curd mixer as claimed in claim 1, wherein said plunger arms are pivotally mounted on cam disks for rotation in opposite directions and carry extensions converging angularly from the position of pivotal connection to said cam disks up to a position of common pivotal connection at their ends.

14. A curd mixer as claimed in claim 13, wherein said cam disks are mounted on shafts supporting gearwheels meshing with one another and one of said shafts is driven by a motor.

* * * * *